United States Patent [19]
Dines

[11] 3,933,688
[45] Jan. 20, 1976

[54] METHOD FOR LITHIATING METAL CHALCOGENIDES AND INTERCALATED PRODUCTS THEREOF

[75] Inventor: Martin B. Dines, Westfield, N.J.

[73] Assignee: Exxon Research and Engineering Company, Linden, N.J.

[22] Filed: Sept. 30, 1974

[21] Appl. No.: 510,383

Related U.S. Application Data

[63] Continuation-in-part of Ser. No. 487,860, July 12, 1974, abandoned.

[52] U.S. Cl. ............... 252/520; 252/518; 252/500; 423/508; 423/511
[51] Int. Cl.² .......................................... H01B 1/02
[58] Field of Search .................. 252/518, 520, 500; 423/508, 511

[56] References Cited
UNITED STATES PATENTS

3,791,867    2/1974    Broadhead ........................ 136/6 R

OTHER PUBLICATIONS

Journal of Less Common Metals, 20 (1970), 121–129.

Science, Vol. 175, (1972), 884–885.

Journal of Chemical Physics, Vol. 58, No. 2, (1973), 697–701.

*Primary Examiner*—Benjamin R. Padgett
*Assistant Examiner*—E. Suzanne Parr
*Attorney, Agent, or Firm*—Joseph J. Dvorak

[57] ABSTRACT

Metal chalcogenides having the general formula $MZ_y$ wherein Z is S, Se and Te; M is an element from Group IVB, VB, Mo, W, Tc, Pt, Re, Ge, Sn and Pb and y is 1.0 to 4.0 are lithiated by lithium compounds selected from $LiR_1$, $LiC(R_1)_3$, $LiN(R_1)_2$, $LiBH(R_1)_3$, $LiR_1.R_2$ and $LiAlH_4.R_2$ wherein $R_1$ is a hydrocarbon radical of 1 to 8 carbon atoms and $R_2$ is a chelating polyamine.

Novel intercalated compounds of the formula $Li_xMZ_y$ are formed wherein M is a Group VB element, Hf, Ti and Zr; Z is S and Se, provided that Z is Se when M is vanadium; y is 1.67 to 2.02 and x is between 0.8 and 1.2.

9 Claims, 1 Drawing Figure

$LiTiS_2$ (x3000) COMPARISON

PREPARED VIA n-BUTYLLITHIUM

PREPARED VIA $Li/NH_3$

METHOD FOR LITHIATING METAL CHALCOGENIDES AND INTERCALATED PRODUCTS THEREOF

CROSS REFERENCES

This application is a continuation-in-part of application Ser. No. 487,860 filed July 12, 1974, now abandoned.

BACKGROUND OF THE INVENTION

1. Field of the Invention

The present invention is directed toward the lithiation of inorganic metal chalcogenides. More particularly, the present invention is directed toward a novel method of lithiating compounds of metal chalcogenides which exist or are formed in relatively well ordered crystal structures having a plurality of planes with relatively weak attractive forces between the planes, and the novel lithium intercalated products thereof.

As is known, because of the relatively weak forces between the planes of metal chalcogenides, it has been found possible in certain cases to introduce a wide variety of molecules between the planes to form products which are stable at ambient temperatures but which will lose the molecules between the planes under appropriate conditions. These intercalated products have shown many desirable properties including superconductivity and lubricating properties.

2. Description of the Prior Art

Various methods are known for the preparation of lithium intercalated metal chalcogenides, for example, see the following: *Journal of Chemical Physics*, Volume 58, page 697 et seq (1973); published German patent application 2,061,162; National Bureau of Standards Special Publication No. 364; pages 625 et seq (1972); *Journal of Less Common Metals*, Volume 20, page 121 et seq (1970); *Science*, Volume 175, page 884 et seq (1972); *C. R. Acad. SC. Paris*, 5., 276, Series C, page 1283 et seq (1973).

Basically, each of the foregoing references discloses preparative techniques that require extreme conditions or relatively sophisticated or complicated handling; and, each of the techniques often fail to yield suitable products. For example, insertion of lithium in the metal dichalcogenides by the foregoing techniques typically results in less than 0.7 moles of lithium being inserted in the metal dichalcogenide. Often multiphase products result which include unwanted molecules, such as ammonia or nitrogenous contaminants, being inserted within the planes of the transition metal chalcogenide.

SUMMARY OF THE INVENTION

According to the present invention there is provided a method of lithiating metal chalcogenides under controlled conditions. In its simplest sense, the method of the instant invention comprises adding a specific lithium compound to a transition metal chalcogenide. The specific lithium compound is selected from the group consisting of $LiR_1$, $LiC(R_1)_3$, $LiN(R_1)_2$, $LiBH(R_1)_3$, $LiR_1.R_2$ and $LiAlH_4.R_2$ wherein $R_1$ is a hydrocarbon radical having from 1 to 8 carbon atoms and $R_2$ is a chelating polyamine. Typical hydrocarbon radicals include vinyl, butyl, phenyl, methyl and ethyl radicals. Preferred chelating polyamines include tetramethylethylene diamine and pentamethyldiethylene triamine. The metal chalcogenide to which the reactive lithium compound is added has the general formula $MZ_y$ wherein Z is an element selected from the group consisting of sulfur, selenium and tellurium; $y$ is a number between 1.0 and 4.0 and M is an element selected from the group consisting of Group IVB elements, Group VB elements, molybdenum, tungsten, technetium, platinum, rhenium, germanium, tin and lead but not vanadium when Z is sulfur and $y$ is 2. Preferably, M in the formula $MZ_y$ is titanium or tantalum (especially titanium); Z is preferably sulfur or selenium (especially preferred is sulfur); and, $y$ preferably has a numerical value between about 1.60 and about 2.02, especially 2.0.

In another aspect of the present invention, there is provided novel lithium intercalated metal chalcogenides having the general formula $Li_xMZ_y$ wherein Z is sulfur and selenium; M is an element selected from Group VB elements, hafnium and zirconium but not vanadium when Z is sulfur; $y$ is a numerical value between 1.67 and 2.02 and $x$ is a numerical value between 0.8 and 1.2 and preferably 0.9 to 1.1.

In yet another aspect of the present invention there is provided a nitrogen-free lithium titanium sulfide of the formula $Li_xTiS_y$ where $x$ is a numerical value from 0.8 to 1.2; and preferably 0.9 to 1.1 and $y$ is a numerical value from 1.67 to 2.02.

These and other features of the instant invention will be described herein in greater detail.

THE FIGURE

The sole FIGURE is a side-by-side comparison of electron microphotographs having a magnification factor of 3000 of samples of a lithium intercalated titanium sulfide prepared in liquid ammonia by prior art technique and the lithium intercalated titanium sulfide prepared in accordance with the present invention.

DETAILED DESCRIPTION OF THE INVENTION

Figure 1:
Figure 2:
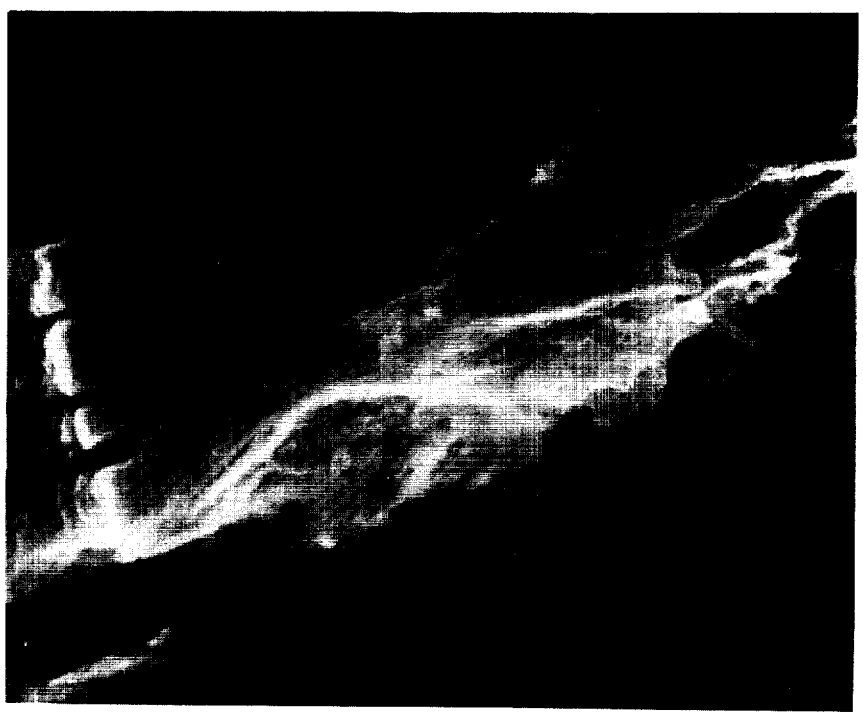

In the practice of the present invention metal chalcogenides are lithiated under controlled conditions by adding a specific lithium compound to a metal chalcogenide. The lithium compound employed is selected from the group consisting of $LiR_1$, $LiC(R_1)_3$, $LiN(R_1)_2$, $LiR_1.R_2$ and $LiAlH_4.R_2$ wherein $R_1$ is a hydrocarbon radical having from 1 to 8 carbon atoms and $R_2$ is a chelating polyamine. Typical hydrocarbon radicals include vinyl, butyl, phenyl, methyl, ethyl and the like. Typical chelating polyamines include tetramethylethylene diamine, pentamethyldiethylene triamine and hexamethyltriethylene tetramine. In the preferred embodiment of the present invention, the lithium compound is n-butyl lithium.

The foregoing lithium compounds are prepared by well known techniques which form no part of the present invention. Indeed, the preferred lithium compound, as well as others, is a commercially available compound.

In general, the lithium compound is dissolved in an aprotic solvent or diluent such as hexane, heptane, benzene, toluene or tetrahydrofuran. Then, the solution of the lithium compound is added to the metal chalcogenide, at a temperature in the range of from about −100°C. to 100°C., and preferably at ambient temperatures. The mixture is allowed to stand (stirring is optional) for a time sufficient for lithiation of the metal chalcogenide to occur. Generally, such reaction time is between a half day to 30 days or more. While stirring tends to speed the lithiation of the metal chalcogenide, stirring also tends to promote the formation of powdered products. Thus, if the crystal size of metal chalcogenide is to be substantially maintained stirring the mixture is not preferred.

As will be appreciated the specific lithium compounds are generally air or moisture sensitive and consequently the lithium compound and the metal chalcogenide are handled in inert gas atmospheres, such as nitrogen, helium or argon.

Although a stoichiometric amount of the lithium compound and metal chalcogenide can be used, it is preferred in the practice of the present invention to use an excess of the specific lithium compound. For example, it is particularly preferred to use a 50% mole excess of the lithium compound.

The reaction can be followed by assaying a supernatant liquid for basic lithium or in the case of when n-butyl lithium is employed as the lithium compound, the extent of reaction also can be followed by monitoring the reaction mixture for the formation of octane, a coproduct.

Generally, the reaction is carried out at atmospheric pressure, although pressures up to 5 atmospheres or more may be employed.

As indicated previously, the metal chalcogenide employed in the present invention has the general formula $MZ_y$ wherein M is an element selected from the group consisting of Group IVB elements, Group VB elements, molybdenum, tungsten, technetium, platinum, rhenium, germanium, tin and lead; Z is a chalcogen, i.e., Z is an element selected from the group consisting of sulfur, selenium and tellurium; and $y$ has a numerical value between 1.0 and about 4.0; provided, however, that when M is vanadium and y is 2, Z is selenium and tellurium only.

The term "Group" refers to the particular Group of the Periodic Table of the elements of the type set forth on the inside cover of *The Merck Index* (7th ed.).

The foregoing metal chalcogenides are readily prepared by well known techniques such as heating the elements at elevated temperatures in the requisite ratios or by metathetical reactions of the metal halides with hydrogen sulfide and the like. Many of these metal chalcogenides are commercially available also.

The lithium intercalated metal chalcogenides of the present invention may be utilized as cathode active materials in batteries such as set forth in copending application, Ser. No. 396,051, filed Sept. 10, 1973 and herein incorporated by reference.

The following examples shall serve to further illustrate the instant invention.

EXAMPLE 1

Reaction of the Metal Chalcogenide with n-butyl Lithium

In the following example n-butyl lithium was employed as the reactive lithium compound for lithiating the metal chalcogenide. The n-butyl lithium employed was a commercially available material of approximately 1.6 molar in normal hexane. In most instances this commercially available n-butyl lithium was diluted further with hexane to provide a solution approximately 0.1 molar.

Prior to use, the precise concentration of n-butyl lithium starting reagent was determined by withdrawing an aliquot in a dry box, allowing the solvent to evaporate in a hood and quenching the remaining white material with ethanol and then water. A few drops of phenolphthalein indicator solution were added to the hydrolysate and the resultant solution was back titrated by first adding excess 0.1N HCl and then neutralizing with standard base.

To a known amount of the transition metal chalcogenide was added 0.5 molar excess of the hexane solution of n-butyl lithium. The material was kept for a period of between three days and three weeks under ambient conditions in a dry box. The reaction mixture was then filtered and a solid material washed once with normal hexane that had been distilled from $P_2O_5$. The collected filtrate was assayed and the amount of lithium that reacted with the metal chalcogenide was inferred by loss of active base. The inferred lithium content was also checked by chemical analysis of representative samples of lithiated products; and these chemical analysis compared favorably with inferred results. For example, $TiS_2$ and $TaS_2$ were lithiated in the manner set forth above and it was found that substantially one mole of lithium reacted with one mole of metal chalcogenide based on unreacted n-butyl lithium. Direct chemical analysis was as follows: $LiTiS_2$ Calc. Li:5.88%, found: 5.79, 5.98, 5.87%; $LiTaS_2$ Calc. Li:2.78%, found 2.75, 2.62%.

The results of the foregoing experiments are given below in Table I.

TABLE I

| Metal Chalcogenide | Product |
|---|---|
| $TaS_2$ | $Li_{0.94}TaS_2$ |
| $TiS_2$ | $Li_{1.03}TiS_2$ |
| $Ti_{1.1}S_2$ | $Li_{0.88}Ti_{1.1}S_2$ |
| $Ti_{1.16}S_2$ | $Li_{0.68}Ti_{1.16}S_2$ |
| $ZrS_2$ | $Li_{1.0}ZrS_2$ |
| $HfS_2$ | $Li_{1.1}HfS_2$ |
| $NbS_2$ | $Li_{0.8}NbS_2$ |
| $MoS_2$ | $Li_{1.06}MoS_2$ |
| $WS_2$ | $Li_{0.28}WS_2$ |
| $TiSe_2$ | $Li_{0.87}TiSe_2$ |
| $ZrSe_2$ | $Li_{1.12}ZrSe_2$ |
| $VSe_2$ | $Li_{1.0}VSe_2$* |
| $NbSe_2$ | $Li_{1.0}NbSe_2$ |
| $HfSe_2$ | $Li_{0.87}HfSe_2$ |
| $TaSe_2$ | $Li_{0.88}TaSe_2$ |
| $TiTe_2$ | $Li_{0.8}TiTe_2$ |
| $HfTe_2$ | $Li_{0.54}HfTe_2$ |
| $VTe_2$ | $Li_{1.71}VTe_2$ |
| $MoTe_2$ | $Li_{0.36}MoTe_2$ |
| $WSe_2$ | $Li_{1.5}WSe_2$ |
| $MoSe_2$ | $Li_{0.5}MoSe_2$ |
| $ReSe_2$ | $Li_{1.16}ReSe_2$ |
| $PtSe_2$ | $Li_{1.48}PtSe_2$ |
| $V_5S_8$ | $Li_{0.34}V_5S_8$ |
| $TiS_3$ | $Li_{3.0}TiS_3$ |
| $ZrS_3$ | $Li_{4.5}ZrS_3$ |
| $ZrSe_3$ | $Li_{4.7}ZrSe_3$ |
| $HfS_3$ | $Li_{2.5}HfS_3$ |
| $HfSe_3$ | $Li_{2.9}HfSe_3$ |
| $NbS_3$ | $Li_{2.22}NbS_3$ |
| $NbSe_3$ | $Li_{3.16}NbSe_3$ |
| $Bi_2Te_3$ | $Li_{1.26}Bi_2Te_3$ |
| $VS_4$ | $Li_2VS_4$ |
| $GaS$ | $Li_{0.2}GaS$ |

*only 1 mole equivalent of n-butyl lithium added

As will be appreciated from an examination of the foregoing table, the method of the present invention gives lithiated metal chalcogenides of unusually high lithium content. Indeed X-ray diffraction powder patterns verify that the novel compositions of the formula $Li_xMZ_y$ where Z is sulfur and selenium; M is an element selected from Group VB elements titanium, zirconium, hafnium but not vanadium when Z is sulfur; $x$ is from 0.8 to 1.2 and y is a value from 1.67 to 2.02; are intercalated species; i.e., the X-ray data shows the presence of intercalated phases.

EXAMPLE 2

This example demonstrates the use of other lithium compounds in the formation of intercalated lithium chalcogenides.

The procedure used followed substantially that of Example 1. The test conditions and results are summarized in Table II.

TABLE II

| Lithium Compound | Solvent | Product |
|---|---|---|
| $LiN(CH_3)_2$ | Benzene | $Li_xTiS_2$ |
| $LiBH(C_2H_5)_3$ | THF | $Li_xTaS_2$ |
| Li n-butyl TMEDA | Hexane | $Li_xTaS_2$ |
| $LiAlH_4$ PMDT | Benzene | $Li_xTaS_2$ |
| $Li\ C_6H_5$ | Benzene | $Li_xTaS_2$ |
| $Li\ C_2H_3(Vinyl)$ | THF | $Li_xTaS_2$ |
| $Li\ C_5H_5(Cyclopentadienyl)$ | THF | $Li_xTaS_2$ |
| $LiC(C_6H_5)_3$ | Hexane | $Li_xTaS_2$ |

PMDT = pentamethyldiethylene triamine
TMEDA = tetramethylethylene diamine

The value of $x$ in the foregoing products ranged from 0.1 to 1.0. Intercalation of the chalcogenide was also verified by X-ray powder diffraction patterns.

EXAMPLE 3

This example demonstrates a very significant feature of the present invention by comparing lithium intercalated titanium disulfide prepared by a prior art process utilizing a solution of lithium metal in liquid ammonia aand utilizing n-butyl lithium as disclosed herein.

The $LiTiS_2$ prepared via n-butyl lithium followed the procedure of Example 1. The $LiTiS_2$ prepared in liquid ammonia was made as follows:

A glass pressure tube fitted with a valve was loaded with 2.000 g (0.01786 moles) $TiS_2$ and 0.125 g (0.01786 moles) Li cut into ¼ inch pieces. Then 10 ml of freshly distilled ammonia (from sodium) was condensed into the tube and the valve closed. The tube was allowed to warm to ambient temperature (about 22°C.). After 2 hours the ammonia was allowed to evaporate. The remaining solid was heated to about 250°C. in a vacuum of less than about $10^{-2}$ torr. for a period of about 0.5 hr. Chemical analysis of the product is given in Table III below.

TABLE III

| Element | % Found | % Calculated for $LiTiS_2$ |
|---|---|---|
| Ti | 39.75 | 40.33 |
| S | 50.73 | 53.78 |
| Li | 5.55 | 5.88 |
| N | 3.35 | 0 |
| H | 0.31 | 0 |

As can be seen the $LiTiS_2$ material prepared in liquid ammonia contained more than 3.5% by weight of nitrogen-hydrogen contaminant despite the attempts to completely remove the nitrogen-hydrogen contaminant. The presence of protons is also confirmed by nuclear magnetic resonance analysis. Indeed, using transient solid-state nmr techniques, the lithium spin lattice relaxation times were measured and the self-diffusion coefficient of the lithium was determined for the sample of $LiTiS_2$ prepared with n-butyl lithium in accordance with this invention and for the $LiTiS_2$ sample prepared in liquid ammonia as described above. The self-diffusion coefficient for the n-butyl lithium product was equal to $10^{-9} cm^2/sec$. whereas for the liquid ammonia product it was less than $2 \times 10^{-10} cm^2/sec$. This data shows that the lithium in the $LiTiS_2$ product of the present invention is diffusing at least five times faster than the lithium in the amminated product.

Additionally, the nitrogen-hydrogen contaminant, mentioned above, adversely affects the crystallinity of lithium intercalated metal chalcogenide. This is shown very dramatically in the electron microphotographs of the FIGURE. The material prepared according to this invention is free of nitrogen-hydrogen contaminants and is highly crystalline, whereas the material prepared by the prior art technique is not truly $LiTiS_2$ but is an amminated species of $LiTiS_2$ that is extremely exfoliated.

EXAMPLE 4

This example illustrates the utility of the intercalated chalcogenides of the present invention.

Lithium titanium sulfide, $Li_{1.0}TiS_2$ was prepared by adding 0.51 grams of titanium disulfide powder to 4 ml of 1.6 molar solution of n-butyl lithium in normal hexane and allowing the mixture to stand for several days in a nitrogen atmosphere. About 15 milligrams of the $Li_{1.0}TiS_2$ prepared is pressed onto a copper plate of 0.5 inches in diameter. This plate was covered with a piece of filter paper as a separator and mounted in a "teflon" holder. A few milliliters of saturated solution of lithium hexafluorophosphate in propylene carbonate were poured into the holder followed by a lithium strip anode of dimensions 0.4 × 2.0 × 0.5 cm. A copper plunger was then screwed down tight into the "teflon" holder. The cell electric contacts were made through the copper plate and plunger.

The initial open circuit voltage of this cell was 1.87 V. An attempt to further discharge the cell at a constant current of 0.2 ma. caused a rapid fall in the cell voltage, indicating that the system was essentially fully discharged. Recharging at one-third ma. was accomplished at applied voltages in the range of 2.4 to 3.1 volts.

What is claimed is:

1. A method of lithiating metal chalcogenides of the formula $MZ_y$ wherein: y

M is an element selected from Group IVB, Group VB elements of the Periodic Table of the Elements, molybdenum, tungsten, technetium, platinum, rhenium, germanium, tin and lead;

y is a numerical value between about 1.0 and about 4.0; and

Z is an element selected from the group consisting of sulfur, selenium and tellurium, provided that when M is vanadium and y is 2, Z is selected from selenium and tellurium only; comprising adding at least a stoichrometric amount of a lithium compound to said metal chalcogenide, said lithium compound being selected from the group consisting of $LiR_1$, $LiC(R_1)_3$, $LiN(R_1)_2$, $LiBH(R_1)_3$, $LiR_1.R_3$ and $LiAlH_4.R_2$ wherein:

$R_1$ is a hydrocarbon radical having from 1 to 8 carbon atoms and $R_2$ is a chelating polyamine.

2. The method of claim 1 wherein said lithium compound is added to said metal chalcogenide at a temperature ranging from about −100°C. to about 100°C.

3. The method of claim 1 wherein said lithium compound is n-butyl lithium.

4. The method of claim 1 wherein M is selected from Ti and Ta; Z is selected from S and Se; and y is between about 1.67 and about 2.02.

5. The method of claim 1 wherein said chelating polyamine is selected from tetramethylethylene-diamine and pentamethyldiethylene triamine.

6. A lithium intercalated metal chalcogenide having the formula $Li_xMZ_y$ wherein:
   M is selected from Group VB elements, Ti, Hf and Zr;
   Z is selected from S and Se, provided that when M is vanadium Z is Se;
   $y$ is between 1.67 and 2.02; and
   $x$ is between 0.8 and 1.2.

7. The lithium intercalated metal chalcogenide of claim 6 wherein $x$ is between 0.9 and 1.1.

8. The lithium intercalated metal chalcogenide of claim 6 wherein M is Ti; Z is S and said chalcogenide is free of nitrogen contaminants.

9. The lithium intercalated metal chalcogenide of claim 6 wherein M is Ta and Z is S.

* * * * *